S. L. CASELLA & P. M. REYNOLDS.
WAVE MOTOR.
APPLICATION FILED JULY 21, 1908.
917,411.
Patented Apr. 6, 1909.
2 SHEETS—SHEET 2.
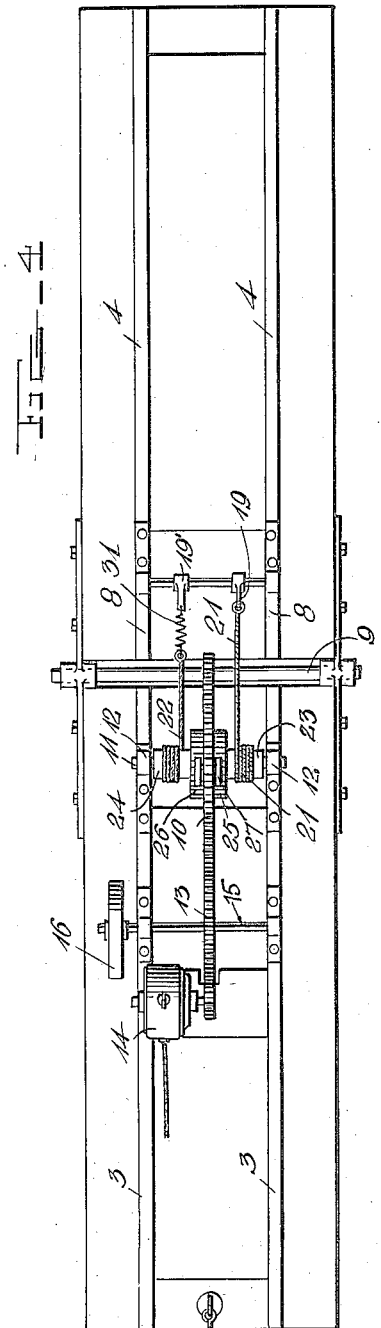
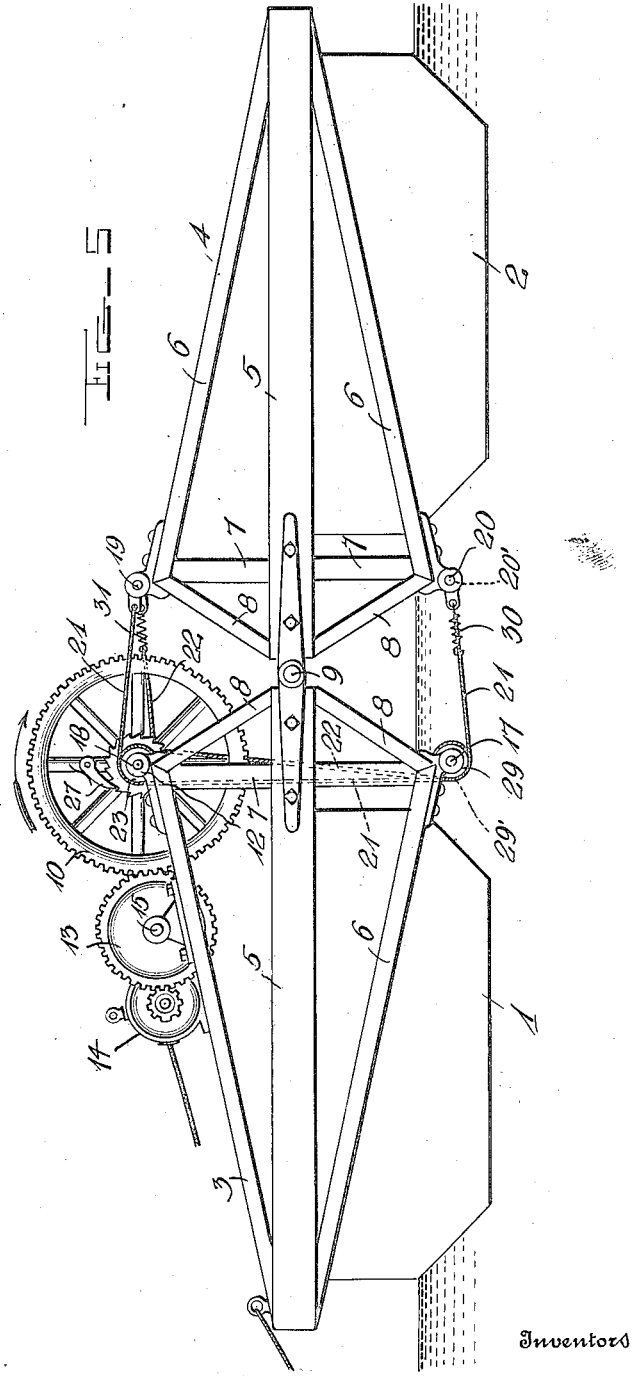
Witnesses
Inventors
P. M. Reynolds,
S. L. Casella,
By John S. Duffie,
Attorney

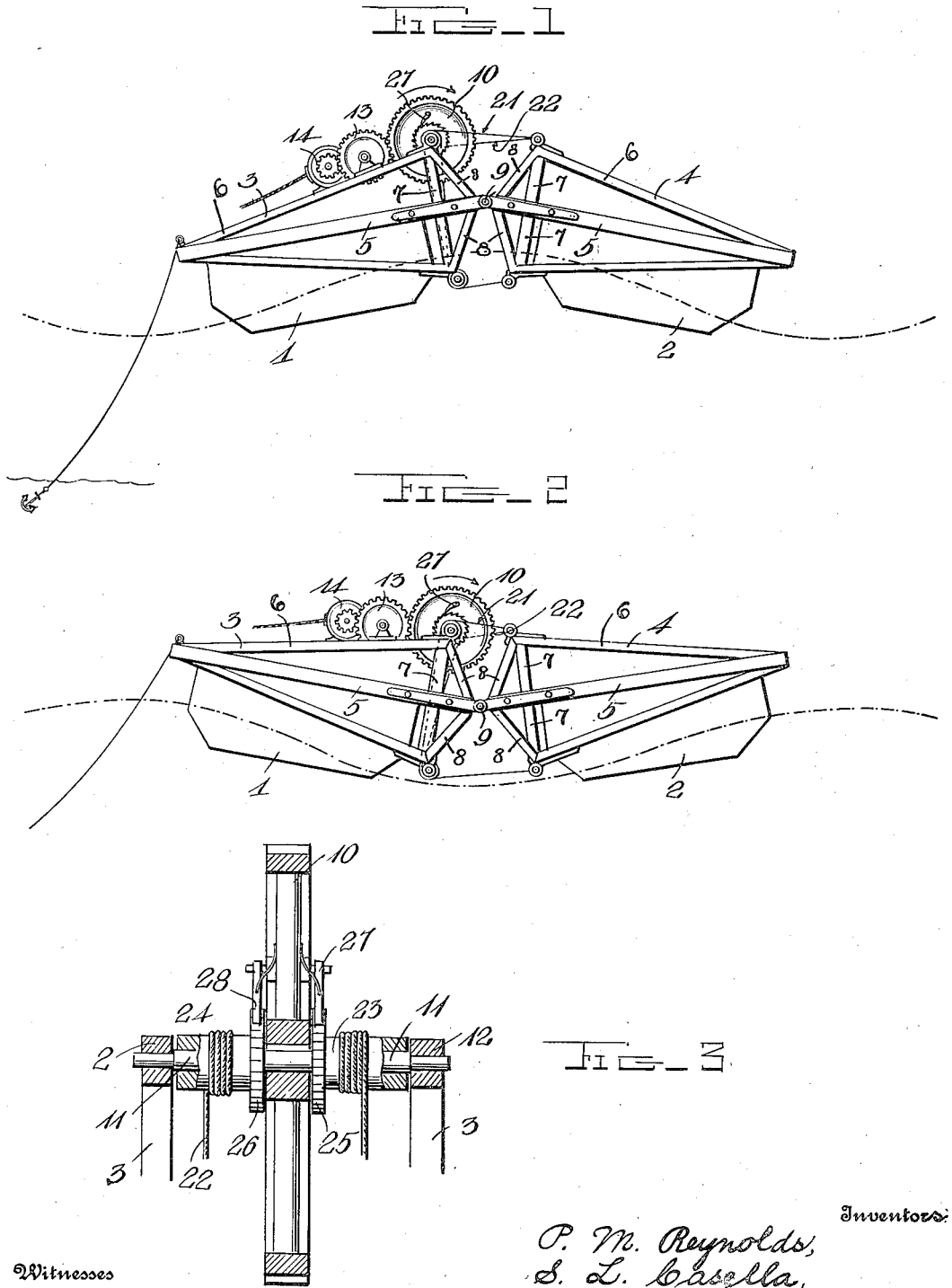

UNITED STATES PATENT OFFICE.

SECONDO L. CASELLA AND PHILIP M. REYNOLDS, OF SAN FRANCISCO, CALIFORNIA, ASSIGNORS TO NATIONAL POWER COMPANY, A CORPORATION OF ARIZONA TERRITORY.

WAVE-MOTOR.

No. 917,411.      Specification of Letters Patent.      Patented April 6, 1909.

Application filed July 21, 1908. Serial No. 444,650.

*To all whom it may concern:*

Be it known that we, SECONDO L. CASELLA and PHILIP M. REYNOLDS, citizens of the United States, residing at San Francisco, in the county of San Francisco and State of California, have invented certain new and useful Improvements in Wave-Motors, of which the following is a specification.

Our invention has relation to wave motors, and to that class in which the devices for generating the power are all carried by a float which may be anchored at any desired point, said float being adapted to be tossed around by the action of the waves, only being limited by the length of the cable to which it is secured.

The great difficulty that has been experienced with the styles of wave motors which have already been invented, is the contemplation of inventors to generate power by means of a motor, or engine, secured to a land structure of some kind, as for instance a wharf or pier; and in view of the fact that heavy storms often sweep away these structures, it is very difficult to make one to generate power successfully and at the same time stand the necessary strains and stresses which they are bound to come into contact with at one time or another.

One of the objects of this invention is to provide a device of the nature above set forth, comprising two floats which will receive the action of the waves, causing them to change their relative positions to each other, the rapidity with which these relative positions are assumed being the direct cause of the amount of production of mechanical power which may be transformed into any other form of power as desired.

With this and other objects in view, our invention consists of the novel construction and arrangement of parts as are hereinafter described in the following specification, illustrated in the accompanying drawings forming a part thereof, and particularly pointed out in the claims hereunto appended.

Reference being had to the drawings, which are for illustrative purposes and therefore not drawn to any particular scale, Figures 1 and 2 are diagrammatic views, showing the device in its extreme elevated and depressed positions. Fig. 3 is a vertical sectional view of the main wheel, and its means of rotation. Fig. 4 is a top plan view of our device. Fig. 5 is a side elevational view of our invention as it would appear in undisturbed waters.

Referring more particularly to the drawings, our invention is described as follows:— The floats 1 and 2, which are to be preferably made in the form of barges, each of which is heavily weighted, have mounted thereon the iron or steel structures 3 and 4. Each of these structures consists of a main beam 5, auxiliary beams 6, vertically disposed braces 7, and auxiliary braces 8, said auxiliary braces and the inner end of the main beam 5, on each structure, coming together at a common point 9, where the structures of each float are pivotally connected to the structures of the adjacent one. Either side of these floats will appear similar, suitable fastening means extending from one of the structures to the other on each particular float, securely binding them together. A main wheel 10, is mounted on a spindle 11; journaled in suitable bearings 12, of said structures 3, of the float 1. Secured to the upper faces of said auxiliary beams 6, of the structures 3, is an idler 13, by means of which a dynamo 14, is rotated. It is observed that whatever means as desired may be employed to convey the power from said main wheel to said dynamo, and such means are suggested as a sprocket chain or cable, or indeed a belt may be employed if found practicable to withstand the strain. Said idler 13, is securely mounted on the spindle 15, one end of which extends outwardly whereto is keyed a fly-wheel 16. Points 17, 18, 19 and 20, lie in the circumference of an imaginary circle, the center of which is at the point 9. Loosely mounted on said spindle 11, are the drums 23 and 24, their inner ends being provided with ratchet wheels 25 and 26, respectively. Pivotally secured to the sides of said main wheel 10, are dogs 27 and 28, which are engaged by said ratchet wheels 25 and 26, respectively, for the rotation of said main wheel in a direction indicated by the arrows in the several figures.

The cable 21, has one of its ends secured at point 19. It then entwines around said drum 23, from where it passes around point 17, traveling over the pulley 29, its other end being secured to a coil spring 30, which is in turn connected to point 20. The object of this spring is to take up any slack which might occur in the cable during the operation of this device. While the floats are in the act of assuming a position indicated by Fig. 1, said main wheel will be rotated by the action of the said cable 21, causing the rotation of the spool 23, the ratchet wheel of which engages said dog 27, of said main wheel.

The cable 22, has one of its ends secured to point $19^1$, which point is directly in rear of point 19, when reference is made to Fig. 5. Said cable then entwines around drum 24, then around the point $29^1$, which is directly in rear of point 29, and has its other end secured to point $20^1$. When the floats of our device are assuming a position illustrated in Fig. 2, said main wheel will be rotated in a manner similar as explained for said cable 21, and it will be observed that said main wheel will always travel in the same direction. Thus, as long as said floats are constantly changing their relative positions to one another, said main wheel will be rotated by the action of either of the cables 21 or 22.

It is clear that it is possible to transfer the power from the machine by any well known means; a dynamo, as illustrated, is preferred, and the power is conducted in the form of a current of electricity by means of an insulated wire, or a cable, and stored or utilized in whatever manner as may be practicable.

Though we have specifically described our invention, we may exercise the right to make such modifications and alterations in the minor details of the construction and arrangement thereof as will not depart from the spirit of our invention, and as will fall within the scope of our claims.

Having described our invention, what we claim as new and desire to secure by Letters Patent, is:—

1. In a wave motor two floats pivotally connected together by means of steel structures adapting them to assume different relative positions in relation to each other, a main wheel, cables so arranged in relation to said structures and said main wheel as to be adapted to rotate the same always in a given direction.

2. In a wave motor comprising two floats pivotally connected together, steel structures, two of each mounted on each of said floats, a main wheel mounted on a spindle journaled between suitable bearings on the upper faces of said structures of one of said floats, cables, one arranged to rotate said main wheel in a given direction when said wave motor is assuming an elevated position, the other oppositely arranged so as to cause said wheel to rotate in the same direction while said wave motor is assuming a depressed position, and a dynamo operated by transferring the power from said main wheel by suitable means.

3. In a wave motor, adapted to be anchored at a desired point, a dynamo, a cable running from said dynamo to any desired point, said dynamo operated by means of a main wheel, said main wheel operated by means of cables arranged oppositely, adapting said main wheel to be turned always in the same direction whether said wave motor is assuming an elevated or depressed position.

4. In a wave motor a main wheel mounted on a spindle journaled between suitable bearings, drums, one of each loosely mounted on said spindle on either side of said main wheel, ratchet wheels, one secured to the inner end of each drum, dogs, one pivotally connected to each side of said main wheel, said dogs engaged by said ratchet wheels when said ratchet wheels rotate in a given direction, cables, one connected at one of its ends to a substantial point, then entwined around one of said drums, then passing around a pulley mounted on a spindle journaled between suitable bearings, then having its other end connected to one end of a spring, said spring having its opposite ends connected to a substantial point, said cable so connected to rotate said main wheel in a given direction when said wave motor is assuming an elevated position, said other cable being oppositely arranged to rotate said main wheel in the same direction when said wave motor is assuming a depressed position.

In testimony whereof we affix our signatures, in presence of two witnesses.

SECONDO L. CASELLA.
PHILIP M. REYNOLDS.

Witnesses:
JOHN J. DUFFIE,
J. E. HARPER.